US011045369B2

(12) United States Patent
Williams

(10) Patent No.: US 11,045,369 B2
(45) Date of Patent: Jun. 29, 2021

(54) ADJUSTABLE SEAT COMFORT WHEELCHAIR

(71) Applicant: Juanita Williams, Wildwood, FL (US)

(72) Inventor: Juanita Williams, Wildwood, FL (US)

( * ) Notice: Subject to any disclaimer, the term of this patent is extended or adjusted under 35 U.S.C. 154(b) by 366 days.

(21) Appl. No.: 16/267,987

(22) Filed: Feb. 5, 2019

(65) Prior Publication Data

US 2020/0246207 A1 Aug. 6, 2020

(51) Int. Cl.

*A61G 5/10* (2006.01)
*A61G 5/04* (2013.01)
*A61G 5/12* (2006.01)
*B60L 50/60* (2019.01)

(52) U.S. Cl.

CPC ........... *A61G 5/1059* (2013.01); *A61G 5/045* (2013.01); *A61G 5/1051* (2016.11); *A61G 5/1067* (2013.01); *A61G 5/121* (2016.11); *A61G 5/125* (2016.11); *A61G 5/128* (2016.11); *B60L 50/66* (2019.02); *A61G 2203/14* (2013.01); *B60L 2200/24* (2013.01)

(58) Field of Classification Search

CPC ...... A61G 5/1067; A61G 5/045; A61G 5/128; A61G 5/1059; A61G 5/14

See application file for complete search history.

(56) References Cited

U.S. PATENT DOCUMENTS 4,707,026 A 11/1987 Johansson
5,024,486 A * 6/1991 Auel ........................ A61G 5/00 297/330
D398,565 S * 9/1998 Knabusch .................... D12/131
5,865,457 A * 2/1999 Knabusch .............. A61G 5/006 280/304.1
D569,769 S 5/2008 Chiu
9,084,705 B2 7/2015 Jaenke
9,241,851 B2 1/2016 De Laurentis
9,795,528 B1 * 10/2017 Delmestri ................ A61G 5/14
10,080,438 B2 * 9/2018 Paul ......................... A61G 5/14
2014/0070585 A1 * 3/2014 LaPointe ................ F16B 4/004 297/316
2015/0209207 A1 * 7/2015 Cooper .................... A61G 5/14 701/49
2015/0231002 A1 8/2015 Gierse
2016/0052139 A1 2/2016 Hyde
2017/0095381 A1 * 4/2017 Griffith .................. A61G 5/006
2020/0030167 A1 * 1/2020 Palombo ................ A61G 5/041

FOREIGN PATENT DOCUMENTS

WO WO7900647 A * 9/1979

* cited by examiner

*Primary Examiner* — Steve Clemmons

(57) ABSTRACT

An adjustable seat comfort wheelchair for maximizing comfort and convenience includes a chair base, a chair seat with a chair back, a headrest, a pair of armrests, a seat bottom, and a footrest. An electric drive train is coupled to the chair base and comprises: a battery compartment housing a rechargeable battery, a motor that is in operational communication with the rechargeable battery, a drive chain coupled to the motor, a pair of rear wheels that are driven by the motor coupled to the drive chain, a steering linkage, a pair of front wheels, a steering actuator, a control module, a lift piston, and a control stick that is in operational communication with the control module to operate the motor, the steering actuator, and the lift piston. The lift piston lifts the seat bottom to a lifted position to assist the user in standing.

12 Claims, 5 Drawing Sheets

48 36 80 66 22 74 82 76 116 86 100 107 114 110

ADJUSTABLE SEAT COMFORT WHEELCHAIR

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to wheelchairs and more particularly pertains to a new wheelchair for maximizing comfort and convenience.

BRIEF SUMMARY OF THE INVENTION

An embodiment of the disclosure meets the needs presented above by generally comprising a chair base comprising a left side separated from a right side, a back side separated from a front side, and an open top side separated from an open bottom side forming an inner compartment. The front side has a footrest aperture extending through to the inner compartment. A chair seat comprising a chair back pivotably coupled to the back side adjacent the top side is coupled to the chair base. The chair back has an upright position and an alternate reclined position. A headrest is coupled to a top end of the chair back. A pair of armrests is coupled to the open top side adjacent the right side and the left side of the chair base. A seat bottom is coupled to the chair base. The seat bottom has a seat hinge coupled to the top side adjacent the front side and a sit position and an alternate lifted position. A footrest is coupled to the chair base. The footrest has a footrest hinge coupled to each of the left side and the right side within the footrest aperture of the front side. The footrest has a folded position covering the footrest aperture and an alternate extended position extending in front of the chair base. An electric drive train is coupled to the chair base. The electric drive train comprises: a battery compartment housing a rechargeable battery that is coupled to the back side adjacent the bottom side, a motor that is in operational communication with the rechargeable battery coupled within the inner compartment to the chair base, a drive chain coupled to the motor, a pair of rear wheels that are driven by the motor coupled to the drive chain, a steering linkage coupled within the inner compartment of the chair base, a pair of front wheels coupled to the steering linkage, a steering actuator coupled to the steering linkage that manipulates the steering linkage to adjust the direction of the wheels, a control module that is in operational communication with each of the motor and the steering actuator coupled within the inner compartment of the chair base, a lift piston that moves the seat bottom between the sit position and the alternate lifted position coupled to the control module and the seat bottom, and a control stick that is in operational communication with the control module to operate the motor, the steering actuator, and the lift piston coupled to the pair of armrests.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
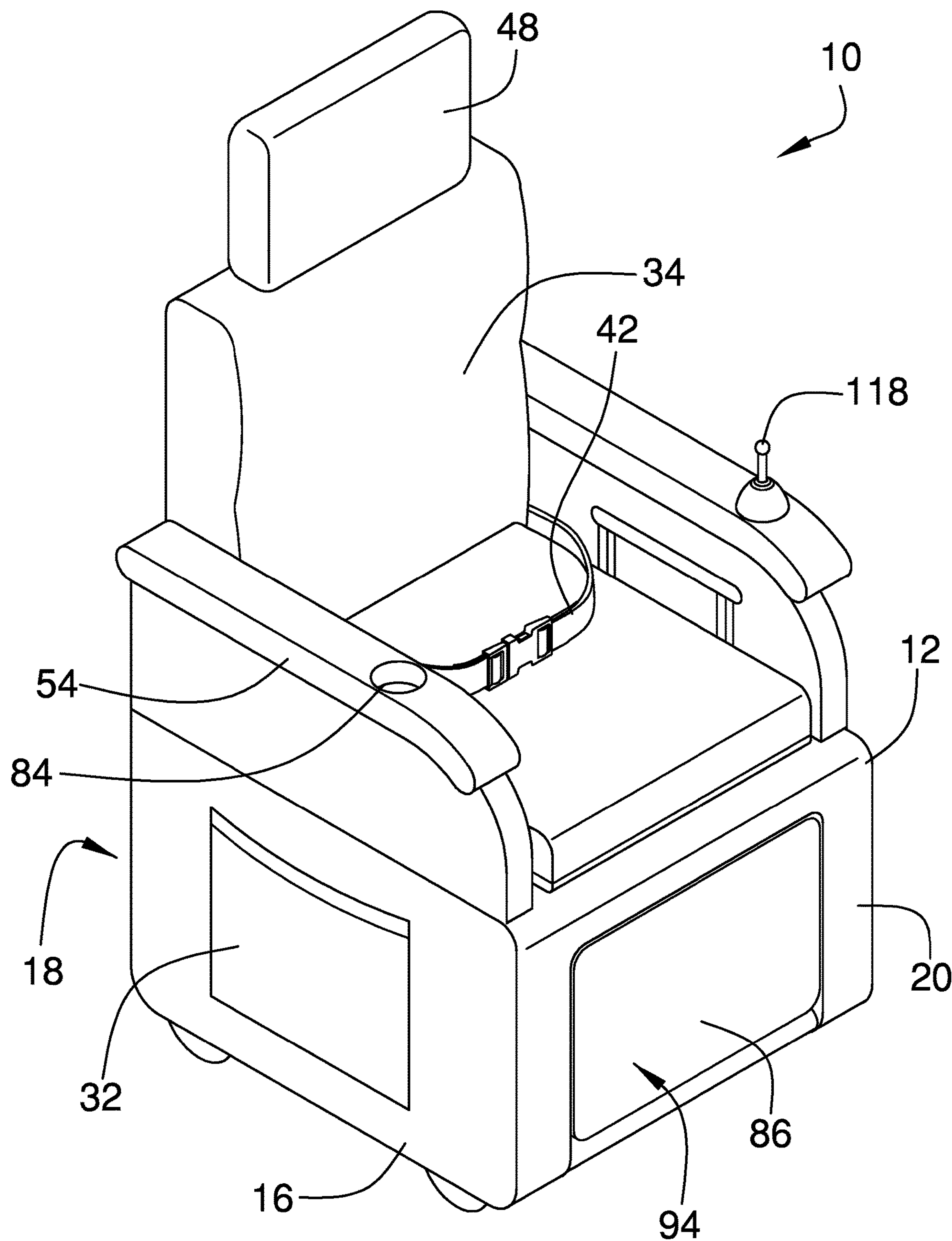
FIG. 1 is an isometric view of an adjustable seat comfort wheelchair according to an embodiment of the disclosure.
Figure 2:
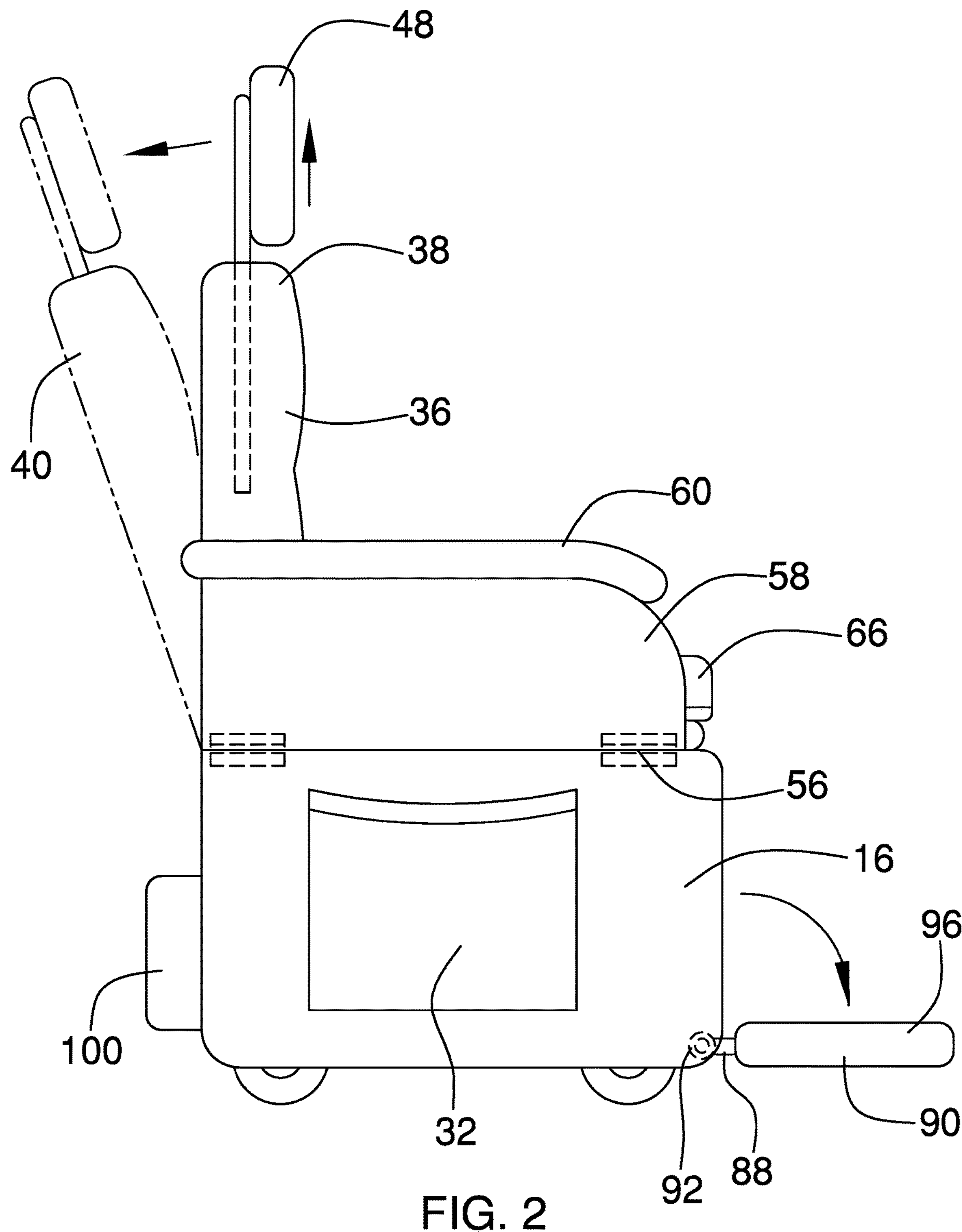
FIG. 2 is a side elevation view of an embodiment of the disclosure.
Figure 3:
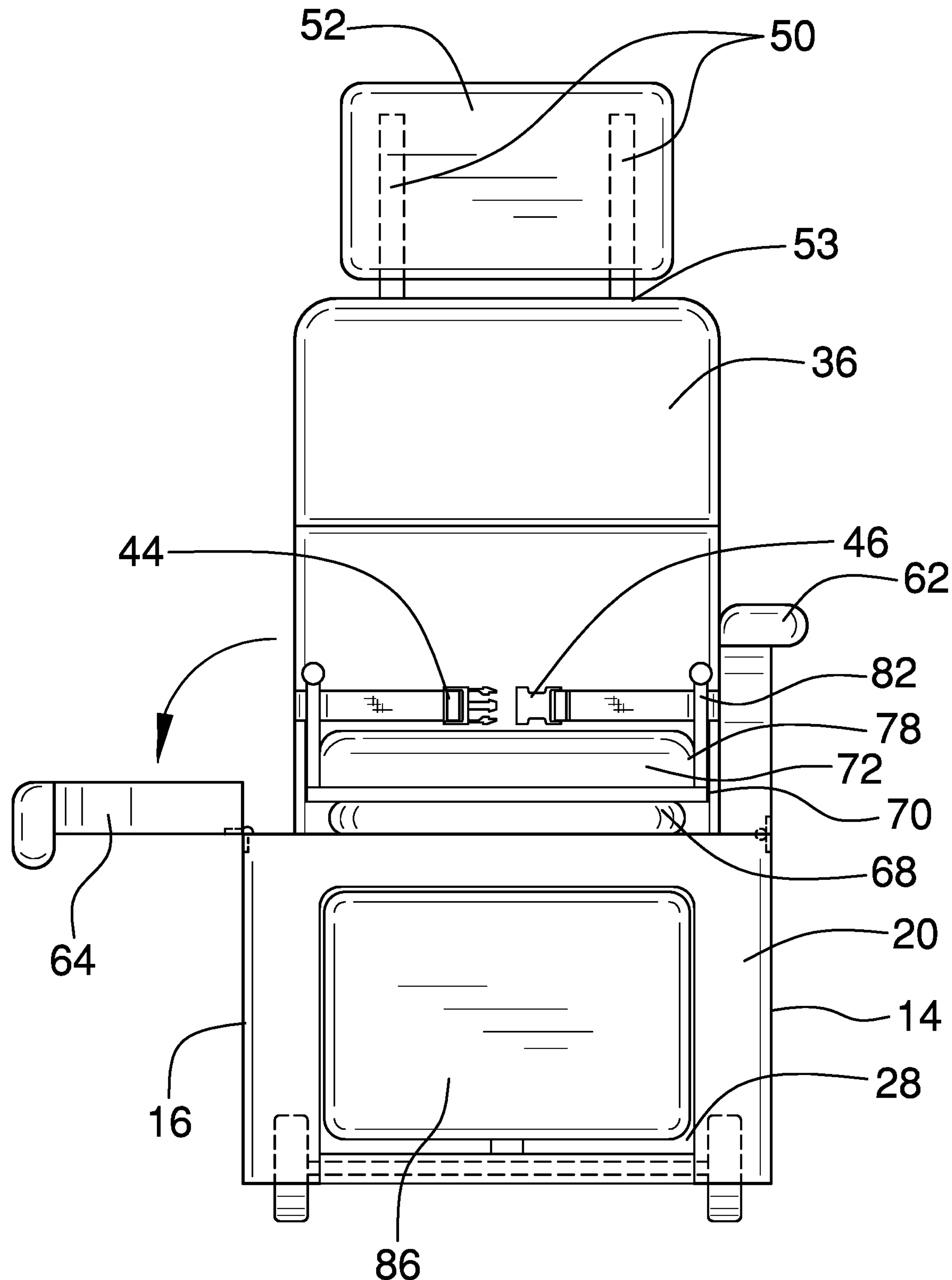
FIG. 3 is a front elevation view of an embodiment of the disclosure.
Figure 4:
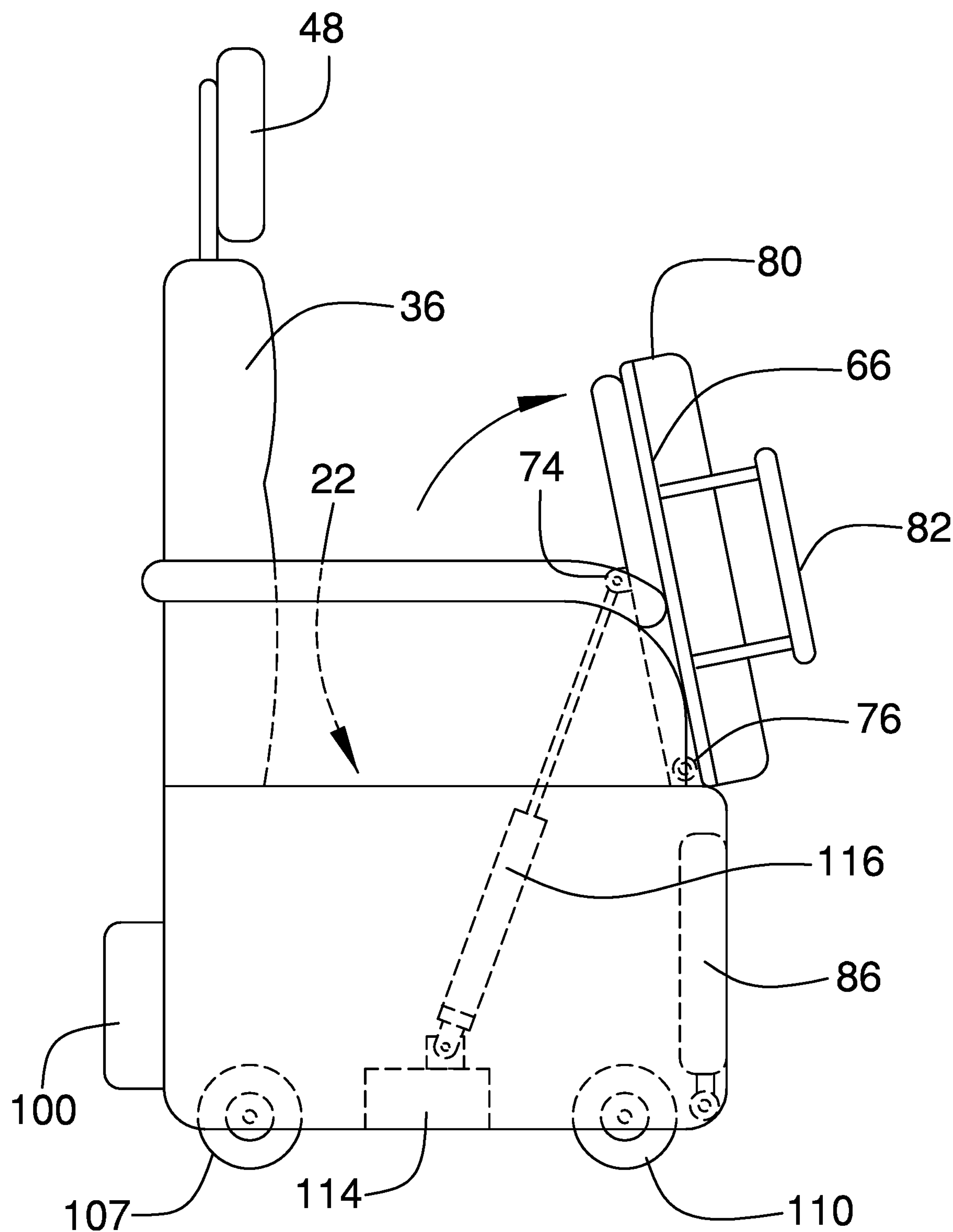
FIG. 4 is a side elevation view of an embodiment of the disclosure.
Figure 5:
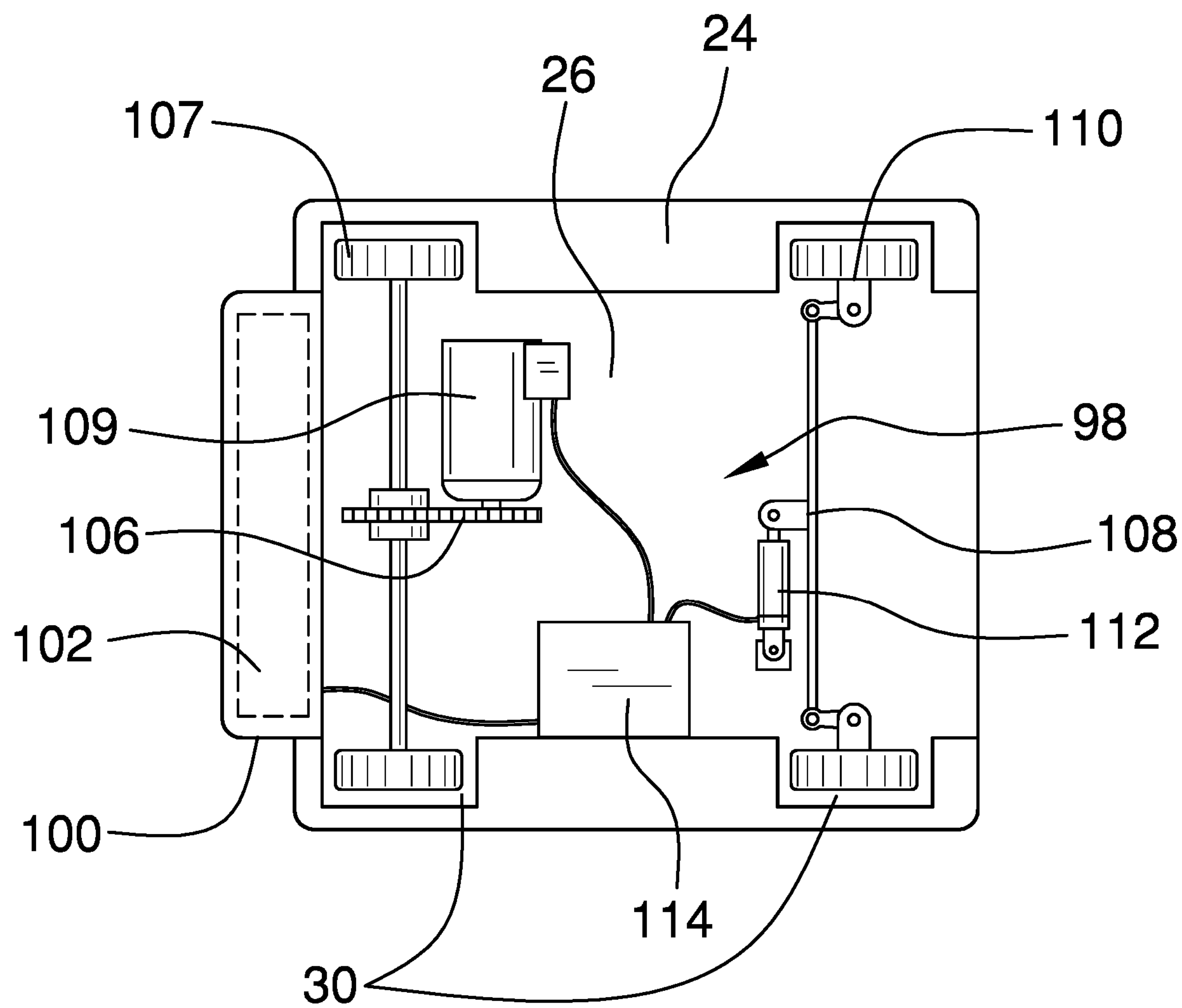
FIG. 5 is a bottom plan view of an embodiment of the disclosure.

With reference now to the drawings, and in particular to FIGS. 1 through 5 thereof, a new wheelchair embodying the principles and concepts of an embodiment of the disclosure and generally designated by the reference numeral 10 will be described.

As best illustrated in FIGS. 1 through 5, the adjustable seat comfort wheelchair 10 generally comprises a chair base 12 comprising a left side 14 separated from a right side 16, a back side 18 separated from a front side 20, and an open top side 22 separated from an open bottom side 24 forming an inner compartment 26. The front side 20 has a footrest aperture 28 extending through to the inner compartment 26, and the bottom side 24 has a plurality of wheel wells 30. At least one pocket 32 is coupled to the chair base 12. A chair seat 34 is coupled to the chair base 12 and comprises a chair back 36, a headrest 48, a pair of armrests 54, and a seat bottom 66. The chair back 36 is pivotably coupled to the back side 18 adjacent the top side 22 and has an upright position 38 and an alternate reclined position 40. A seat belt 42 is coupled to the chair back 36 and has an adjustment mechanism 44 and a buckle 46. The headrest 48 comprises a pair of support posts 50 coupled to the chair back 36 and a head cushion 52 coupled to the pair of support posts 50. The pair of support posts 50 is slidingly coupled within a top end 53 of the chair back 36 to adjust the height of the head cushion 52. The pair of armrests 54 is coupled to the open top side 22 adjacent the right side 16 and the left side 14 of the chair base 12. Each of the pair of armrests 54 comprises an arm hinge 56, a riser 58 coupled to the arm hinge 56, and an arm cushion 60 coupled to the riser 58. The arm hinge 56 is coupled to the top side 22 to allow the pair of armrests 54 to move between a vertical position 62 and an alternate horizontal position 64 extending away from the chair base 12. The riser 58 and the arm cushion 60 may have a rounded front portion. The seat bottom 66 is coupled to the chair base 12. The seat bottom 66 comprises a seat base 68, a seat platform 70 coupled to the seat base 68, and a seat cushion 72 coupled to the seat platform 70. The seat base 68 has a pivot extension 74 and a seat hinge 76 coupled to the top side adjacent the front side. The seat bottom 66 has a sit position 78 and an alternate lifted position 80. A pair of seat handles 82 is coupled to the seat platform 70. Each of the pair of seat handles 82 extends above the seat cushion 72 to provide support while the seat bottom 66 moves from the sit position 78 to the alternate lifted position 80. A cup holder 84 is coupled to the chair seat 34 within the arm cushion 60. A footrest 86 is coupled to the chair base 12 and comprises a footrest extension 88 and a footrest cushion 90 coupled to the footrest extension 88. The footrest extension 88 has a footrest hinge 92 coupled to each of the left side 14 and the right side 16 within the footrest aperture 28 of the front side proximal the bottom side 24. The footrest 86 has a folded position 94 covering the footrest aperture 28 and an alternate extended position 96 extending in front of the chair base 12. An electric drive train 98 is coupled to the chair base 12. The electric drive train 98 comprises a battery compartment 100 housing a rechargeable battery 102 coupled to the back side 18 adjacent the bottom side 24. A motor 104 that is in operational communication with the rechargeable battery 102 is coupled to the chair base 12 within the inner compartment 26. A drive chain 106 is coupled to the motor 104. A pair of rear wheels 107 driven by the motor 104 is coupled to the drive chain 106 within the plurality of wheel wells 30. A steering linkage 108 is coupled to the chair base 12 within the inner compartment 26. A pair of front wheels 110 is coupled to the steering linkage 108 within the plurality of wheel wells 30. A steering actuator 112 that manipulates the steering linkage 108 to adjust the direction of the wheels is coupled to the steering linkage 108. A control module 114 is coupled to the chair base 12 within the inner compartment 26 and is in operational communication with each of the motor 104 and the steering actuator 112. A lift piston 116 is coupled to, and is in operational communication with, the control module 114 and the seat bottom 66. The lift piston 116 is pivotably coupled to the pivot extension 74 of the seat base 68 and moves the seat bottom 66 between the sit position 78 and the alternate lifted position 80. A control stick 118 is coupled to the pair of armrests 54 and is in operational communication with the control module 114 to operate the motor 104, the steering actuator 112, and the lift piston 116.

In use, the adjustable seat comfort wheelchair 10 provides a comfortable sitting wheelchair to provide automated movement using the control stick 118 to operate the electric drive train 98. The lift piston 116 is operated to move the seat bottom 66 from the sit position 78 to the alternate lifted position 80 to assist a user in standing up out of the chair seat 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. An adjustable seat comfort wheelchair comprising:

a chair base comprising a left side separated from a right side, a back side separated from a front side, and an open top side separated from an open bottom side forming an inner compartment, the front side having a footrest aperture extending through to the inner compartment;

a chair seat coupled to the chair base, the chair seat comprising:

a chair back pivotably coupled to the back side adjacent the top side, the chairback having an upright position and an alternate reclined position;

a headrest coupled to the chair back, the headrest being coupled to a top end of the chairback;

a pair of armrests coupled to the chair base, the pair of armrests being coupled to the open top side adjacent the right side and the left side; and a seat bottom coupled to the chair base, the seat bottom having a seat hinge coupled to the top side adjacent the front side, the seat bottom having a sit position and an alternate lifted position;

a footrest coupled to the chair base, the footrest having a footrest hinge coupled to each of the left side and the right side within the footrest aperture of the front side, the footrest having a folded position covering the footrest aperture and an alternate extended position extending in front of the chair base;

an electric drive train coupled to the chair base, the electric drive train comprising:

a battery compartment coupled to the back side adjacent the bottom side, the battery compartment housing a rechargeable battery;

a motor coupled to the chair base, the motor being coupled within the inner compartment, the motor being in operational communication with the rechargeable battery;

a drive chain coupled to the motor;

a pair of rear wheels coupled to the drive chain, the pair of rear wheels being driven by the motor;

a steering linkage coupled to the chair base, the steering linkage being coupled within the inner compartment;

a pair of front wheels coupled to the steering linkage;

a steering actuator coupled to the steering linkage, the steering actuator manipulating the steering linkage to adjust the direction of the wheels;

a control module coupled to the chair base, the control module being coupled within the inner compartment, the control module being in operational communication with each of the motor and the steering actuator; and a lift piston coupled to the control module and the seat bottom, the lift piston moving the seat bottom between the sit position and the alternate lifted position; and a control stick coupled to the pair of armrests, the control stick being in operational communication with the control module to operate the motor, the steering actuator, and the lift piston.

2. The adjustable seat comfort wheelchair of claim 1 further comprising the headrest comprising a pair of support posts and a head cushion coupled to the pair of support posts, the pair of support posts being slidingly coupled within the chairback to adjust the height of the head cushion.

3. The adjustable seat comfort wheelchair of claim 1 further comprising each of the pair of armrests comprising an arm hinge, a riser coupled to the arm hinge, and an arm cushion coupled to the riser, the arm hinge being coupled to the top side of the chair base to allow the pair of armrests to move between a vertical position and an alternate horizontal position extending away from the chair base.

4. The adjustable seat comfort wheelchair of claim 3 further comprising the riser and the arm cushion having a rounded front portion.

5. The adjustable seat comfort wheelchair of claim 3 further comprising a cup holder coupled within the arm cushion.

6. The adjustable seat comfort wheelchair of claim 1 further comprising the seat bottom comprising a seat base, a seat platform coupled to the seat base, and a seat cushion coupled to the seat platform, the seat base having a pivot extension coupled to the lift piston and the seat hinge being coupled within the seat base.

7. The adjustable seat comfort wheelchair of claim 6 further comprising a pair of seat handles coupled to the seat platform, each of the pair of seat handles extending above the seat cushion to provide support while the seat bottom moves from the sit position to the alternate lifted position.

8. The adjustable seat comfort wheelchair of claim 1 further comprising a seat belt coupled to the chair back, the seat belt having an adjustment mechanism and a buckle.

9. The adjustable seat comfort wheelchair of claim 1 further comprising the bottom side having a plurality of wheel wells.

10. The adjustable seat comfort wheelchair of claim 1 further comprising at least one pocket coupled to the chair base.

11. The adjustable seat comfort wheelchair of claim 10 further comprising the footrest comprising a footrest extension and a footrest cushion coupled to the footrest extension, the footrest hinge being coupled to the footrest extension, the footrest hinge being coupled to the chair base proximal the bottom side.

12. An adjustable seat comfort wheelchair comprising:

a chair base comprising a left side separated from a right side, a back side separated from a front side, and an open top side separated from an open bottom side forming an inner compartment, the front side having a footrest aperture extending through to the inner compartment, the bottom side having a plurality of wheel wells;

at least one pocket coupled to the chair base;

a chair seat coupled to the chair base, the chair seat comprising:

a chair back pivotably coupled to the back side adjacent the top side, the chairback having an upright position and an alternate reclined position;

a seat belt coupled to the chair back, the seat belt having an adjustment mechanism and a buckle;

a headrest coupled to the chair back, the headrest comprising a pair of support posts and a head cushion coupled to the pair of support posts, the pair of support posts being slidingly coupled within a top end of the chairback to adjust the height of the head cushion;

a pair of armrests coupled to the chair base, the pair of armrests being coupled to the open top side adjacent the right side and the left side, each of the pair of armrests comprising an arm hinge, a riser coupled to the arm hinge, and an arm cushion coupled to the riser, the arm hinge being coupled to the top side to allow the pair of armrests to move between a vertical position and an alternate horizontal position extending away from the chair base, the riser and the arm cushion having a rounded front portion;

a seat bottom coupled to the chair base, the seat bottom comprising a seat base, a seat platform coupled to the seat base, and a seat cushion coupled to the seat platform, the seat base having a pivot extension, the seat base having a seat hinge coupled to the top side adjacent the front side, the seat bottom having a sit position and an alternate lifted position; and a pair of seat handles coupled to the seat platform, each of the pair of seat handles extending above the seat cushion to provide support while the seat bottom moves from the sit position to the alternate lifted position;

a cup holder coupled to the chair seat, the cup holder being coupled within the arm cushion;

a footrest coupled to the chair base, the footrest comprising a footrest extension and a footrest cushion coupled to the footrest extension, the footrest extension having a footrest hinge coupled to each of the left side and the right side within the footrest aperture of the front side proximal the bottom side, the footrest having a folded position covering the footrest aperture and an alternate extended position extending in front of the chair base;

an electric drive train coupled to the chair base, the electric drive train comprising:

a battery compartment coupled to the back side adjacent the bottom side, the battery compartment housing a rechargeable battery;

a motor coupled to the chair base, the motor being coupled within the inner compartment, the motor being in operational communication with the rechargeable battery;

a drive chain coupled to the motor;

a pair of rear wheels coupled to the drive chain, the pair of rear wheels being driven by the motor, the pair of rear wheels being within the plurality of wheel wells;

a steering linkage coupled to the chair base, the steering linkage being coupled within the inner compartment;

a pair of front wheels coupled to the steering linkage, the pair of front wheels being within the plurality of wheel wells;

a steering actuator coupled to the steering linkage, the steering actuator manipulating the steering linkage to adjust the direction of the wheels;

a control module coupled to the chair base, the control module being coupled within the inner compartment, the control module being in operational communication with each of the motor and the steering actuator; and a lift piston coupled to the control module and the seat bottom, the lift piston being pivotably coupled to the pivot extension of the seat base, the lift piston moving the seat bottom between the sit position and the alternate lifted position; and a control stick coupled to the pair of armrests, the control stick being in operational communication with the control module to operate the motor, the steering actuator, and the lift piston.

* * * * *